Jan. 26, 1937.　　　C. V. BOYS　　　2,068,791
WATER FLOW GAS CALORIMETER
Filed July 16, 1934　　　3 Sheets-Sheet 1

INVENTOR
Charles Vernon Boys,
BY
ATTORNEY

Jan. 26, 1937.  C. V. BOYS  2,068,791
WATER FLOW GAS CALORIMETER
Filed July 16, 1934   3 Sheets-Sheet 2

INVENTOR
Charles Vernon Boys,
BY
Franks Ackerman
ATTORNEY

Jan. 26, 1937.  C. V. BOYS  2,068,791
WATER FLOW GAS CALORIMETER
Filed July 16, 1934  3 Sheets-Sheet 3

Patented Jan. 26, 1937

2,068,791

UNITED STATES PATENT OFFICE 2,068,791

WATER FLOW GAS CALORIMETER

Charles Vernon Boys, London, England

Application July 16, 1934, Serial No. 735,504
In Great Britain April 19, 1934

11 Claims. (Cl. 73—190)

The invention relates to liquid flow calorimeters, that is calorimeters in which the heat produced by a measured flow of gas is employed to heat a measured flow of liquid, the calorific value of the gas being immediately deduced from the rise in temperature of the liquid. Water is the liquid most frequently employed.

The invention aims at providing liquid-flow calorimeters which are very accurate and are at the same time comparatively cheap to manufacture, no extremely expensive material being necessary in their construction.

In existing liquid flow calorimeters the acid products of combustion are found to dissolve and ultimately destroy the base metals with which they come into contact so that it is usual for these parts to have to be replaced after a very few years. The invention also aims at providing apparatus in which such destruction is avoided so completely that the instrument may remain in service for very many years or be practically indestructible.

One object of the invention consists in an apparatus including two main cooling zones for the products of combustion, one zone consisting of a conduit comprising walls formed only from a fusible silicious material capable of resisting the corrosive action of the hot acid gases and the other zone being arranged to receive the gases from the aforementioned zone and consisting of a conduit having walls made of base metal furnished with a corrosive resisting coating. The water passages are arranged so that the liquid is caused first to flow past the second conduit to receive the hot gases in such a direction as to effect a counter-current interchange of heat and then past the first conduit. When the gas is burnt in air, glass may satisfactorily be used for the walls of the first cooling conduit to receive the hot products of combustion. Glass is very suitable for the purpose because it is both cheap and durable. When the gas is burnt in oxygen, heat resisting glass or fused silica may satisfactorily be used instead of ordinary glass. The base metal walls of the second conduit to receive the burnt gases may be protected against corrosion by varnishing them with a synthetic resin such as "bakelite" and then baking the varnish.

A further object of the invention consists in a liquid flow gas calorimeter including a cold liquid jacket surrounding the coldest zone in which the heat is transferred from the products of combustion to the stream of liquid. A hot liquid jacket is also arranged to surround the liquid passages leading from the hottest heat interchange zone to the hot thermometer, the jacket being adapted to receive the hot liquid after it has passed the hot thermometer. The apparatus also includes a metal shield extending from the hot liquid jacket, the shield being arranged to surround those parts of the liquid stream in which the temperature rises rapidly so that the temperature of the shield decreases progressively from the hot liquid jacket and is substantially the same at every level as the temperature of the liquid at the same level. The hot and cold liquid jackets and the shield prevent inaccuracies arising due to changes in external temperature conditions.

A further object of the invention consists in a liquid flow gas calorimeter adapted to burn only a fraction of a cubic foot per hour. Many existing calorimeters are designed to burn several cubic feet of gas per hour and are consequently of such a nature that it takes a long time for the temperature to settle down to a steady value after the instrument has been started. Calorimeters according to the invention may be made of such a size that not only does the temperature settle down to a steady value soon after starting, but also large sampling bells, which are costly and inconvenient, need not be used when the calorific value of a sample of gas is required.

Yet another object of the invention consists in an apparatus comprising a gas burner including two vertical tubes having adjacent upper ends and arranged to feed the gas flame, a primary conduit made of fusible silicious material arranged to receive the products of combustion from the burner, a secondary conduit communicating directly with the primary conduit so as to receive the products of combustion after they have passed through the primary conduit, both the conduits being sealed against the entry of surrounding air and one of the said tubes in the burner being arranged so that it can be connected to a source of supply of gas, while the other of the said tubes is arranged so that it can be connected to a source of supply of combustion supporting gas. The gases can be supplied to the two tubes from gas doling instruments according to patent application Serial No. 735,503 filed 16th July 1934. The exact information available as a result of the measuring of all the ingoing gas enables corrections to be calculated. The exact ratio of air to gas is readily ascertained and the knowledge of this ratio, as well as of the contraction on combustion, is required for the purpose of making corrections for the very small gains or losses of heat due to the escaping gases not being at exactly the same temperature as the incoming air and gas, or not carrying away exactly the same quantities of water vapour as enters the instrument.

More particularly defined the invention consists in a liquid flow gas calorimeter comprising in combination, a gas burner, a primary conduit arranged to receive the products of combustion from said burner, a secondary conduit communicating directly with said primary conduit so as to receive the products of combustion after they have passed through said primary conduit, and means for conveying a stream of cooling liquid first over the walls of said secondary conduit in such a direction as to effect a counter-current interchange of heat with the products of combustion and then over the walls of said primary conduit, said primary conduit being made of a fusible silicious material capable of resisting the corrosive action of the hot acid products of combustion and of such dimensions that a large proportion of the heat of the products of combustion is abstracted before they reach said secondary conduit, while the latter comprises base metal walls and a corrosion-resisting coating. The silicious walls of the primary conduit are in contact on one side with the hot acid products of combustion and on the other side with the cooling liquid.

The invention further comprises the elements and combinations of parts set forth in the annexed claims.

In order that the invention may be clearly understood and readily carried into effect, apparatus constructed in accordance therewith will now be described by way of example with reference to the accompanying drawings, in which:—

Figure 1:
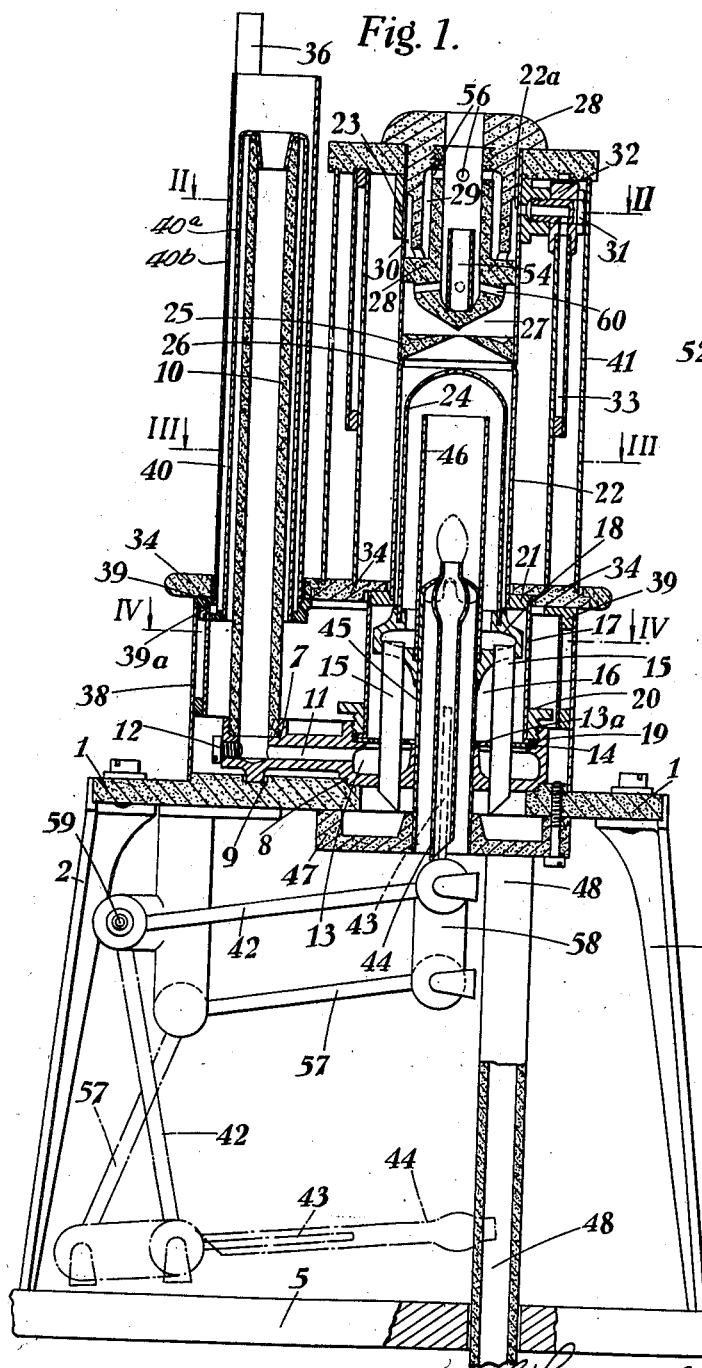
Figure 1 shows a sectional elevation of a water flow gas calorimeter.

Referring to Figures 1 to 4, those parts of the apparatus in which an interchange of heat between the products of combustion of the gas being tested and the stream of water takes place, are mounted upon a base 1 supported in a raised position by four legs 2. The water enters the apparatus at the upper end of a vertical pipe 36 connected at its lower end with a water jacket 38 surrounding the cooler parts of the apparatus. The jacket 38 is closed at its upper end by a cast ring 39 and the water leaves the jacket by passing through holes 39a, drilled in the cast ring 39 communicating with an annular space 40 between two vertical tubes 40a and 40b which extend to the top of the apparatus and are supported by the cast ring 39. The upper end of the inner one 40a of these two tubes is formed into a re-entrant funnel which dips into the upper end of a vertical pipe 10 concentric with the annular space 40. After rising in the annular space 40, the water flows over the edge of the funnel into the pipe 10. A mercurial or electrical thermometer (not shown) is placed in the pipe 10 for indicating the temperature of the water entering the apparatus. The lower end of the pipe 10 is screwed to a casting 7, resting in two recesses 8 and 9 in the base 1, and the water, after leaving the pipe 10, passes through a radial passage 11 to an annular space 13 formed in the casting 7. The passage 11 is formed by drilling radially through the casting 7 and closing the outer end of the bore with a stud 12. The top of the annular space 13 is closed by a diaphragm 14. The water stream inside the annular space 13 passes radially between twelve vertical tubes 15 arranged symmetrically about the axis of the annular space 13 and then leaves the annular space 13 through an annular aperture 13a surrounding a tube 45 extending vertically upwards within the casting 7. After reaching the space 16 above the diaphragm 14 the water flows radially outwards between the pipes 15 and upwards until it leaves the space 16 by flowing between a cylindrical wall 17 surrounding the space 16 and a circular casting 18 to an annular space between a cylinder 22 and a combustion vessel 24. In this space the water absorbs the bulk of the heat of combustion of the gas being tested. The small quantity of heat that is not removed from the gases while they are within the vessel 24 is removed by the water when it is in contact with the casting 18 and the twelve tubes 15, the latter being arranged to receive the burnt gases after they have passed through the combustion vessel 24. After rising above the vessel 24, the water meets a constriction in the form of a conical nozzle 25 which brings all the rising water into a compact stream. Any hot and cold streaks or strata in the water stream are caused to mingle by passing through the nozzle 25 so that the temperature of the water stream is thereby rendered much more uniform. The nozzle 25 rests upon a rolled ledge 26 in the tube 22. After passing through the nozzle the water enters a temperature equalizing space 27, the upper end of which is closed by a thermometer pocket 28 made in two parts which are screwed together. The water enters the thermometer pocket through radial holes 60 and passes upwards through the pocket to radial holes 56 which conduct the water to an annular space 29 down which the water passes to another annular space 30 from which it escapes through an aperture 22a in the sleeve 22. After passing through this aperture the water enters a projection on a ring 23 surrounding the upper end of the cylinder 22. The projection carries a drilled screw 31 which serves to clamp a block 32 into position. The block 32 is formed with an internal curved slot which receives a hot water jacket 33. The arrangement is such that the water stream passes through a drilled hole in the screw 31 to the water jacket 33. Leakage between the latter and the block 32 is prevented by soldering the jacket to the block. The jacket 33 extends downwards to the limit of the hot region of the water stream. The water leaves the apparatus through an outlet pipe 55 (Figure 2) screwed in to a boss on the jacket 33 which is located about the level of the screw 31.

Turning now from the water circuit to the gas circuit, the gas burner 43, 44 is supported by a Watt's straight line parallel motion device, shown in its working position by full lines in Figure 1, comprising pivoted tubular arms 42 and 57, joined by a link 58. Gas enters the apparatus through the pivot 59 of the arm 42 and then passes along inside the latter to a central burner tube 43. A tube 44 having a slight swelling near its upper end surrounds the central tube 43. When it is desired to light the burner or inspect it, the parallel motion device is moved downwards to the position shown by chain lines in Figure 1. Then, after the burner has been ignited or inspected, the tubes 43 and 44 are returned to their proper positions. The tube 44 is centralized by means of four claws cut in a tube 45, the swelling at the upper end of the tube 44 serving as a surface which the claws can grip tightly. A chimney 46 surrounding the claws and extending upwards into the combustion vessel 24, is cemented in a recess in the casting 18 so as to make a water-tight joint therewith. The combustion vessel 24 is cemented in a similar manner to the casting 18. As there is a space between the burner tube 44 and the gas tube 43, air can pass upwards between the two tubes and can mix with the gas so as to produce a non-luminous flame at the top of the burner tube. Air can also pass up outside the burner tube 44. The hot gases from the flame rise within the chimney 46 and are deflected by the round top of the vessel 24 so that their direction is reversed. The gases lose heat very quickly at the top of the vessel 24, and also during their descent between the chimney 46 and the vertical wall of the vessel 24. The gases then enter a space within the casting 18 from which they are led by means of the twelve tubes 15 to a space beneath the casting 7 which is closed by a circular member 47. The gases leave the apparatus through a pipe 48 which, in the arrangement shown in Figure 1, extends vertically downwards from the member 47 through the floor 5 of the cupboard in which the apparatus is located.

The vessel 24, which bounds the primary heat exchange zone for the hot gases, is made of ordinary glass or silica. The tubes 15, which define the major portion of the secondary heat exchange zone, may advantageously be made of German silver, because this material is mechanically good and (for a metal) is a bad conductor of heat. The reason why it is desirable to employ a bad heat conductor is because it is desirable that the heat should only flow radially outwards through the thin walls, while there should be as little heat flow along the walls as possible. The tubes 15 are soldered both to the casting 7 and to the casting 18.

The cylindrical wall 17, surrounding the twelve tubes 15, is provided at its lower end with a flange 19 which is pressed upon the diaphragm 14 by a ring screw 20 so as to make a water-tight joint. The upper end of the cylindrical wall 17 is soldered to a ring 21 which carries the long cylinder 22, the latter also being soldered to the ring 21. A cover 34, made in two parts for convenience, rests above the cold water jacket 38 and the water space 16 and is held in position by two long screws 35 (see Figure 4) which extend between the base 1 and the cover 34.

The base 1, the cover 34, the cold water pipe 10, the nozzle 25, the thermometer pocket 28, the circular member 47 and the outlet pipe 48 are all made of ebonite. This material is very suitable for these parts because it is structurally sound, a very bad conductor of heat, impervious to water and is not affected by the acid condensation products of combustion.

The water jacket 38 and the annular water space 40 surround the whole of the cold part of the instrument and constitute a shield of the same temperature so that the cold part of the instrument is protected from fluctuations in the temperature of the surrounding air. The inner wall of the hot water jacket 33 extends down to the cover 34. As the water rises in the cylinder 22 its temperature rises very rapidly because it gains much the greatest portion of its heat as it passes the vessel 24. The shield constituted by the extension of the inner wall of the hot water jacket 33 is, at its upper end, sensibly at the same temperature as the hottest water in the cylinder 22 but its temperature falls away towards its lower end so that its temperature is substantially the same as that of the cylinder 22 at all levels. Further, the hot thermometer pocket, which must be most closely guarded against loss of heat, has its own double hot water shield within the cylinder 22. The space between the tube 22 and the hot water shield may advantageously be packed with any convenient insulating material or be filled with a number of turns of bright metal foil separated from one another by threads of ebonite. A metal protecting tube 41 surrounds the hot parts of the apparatus that lie above the cover 34.

The thermometer pocket 28 contains a small tube 54 made of ebonite, glass or other badly conducting material. The purpose of this is to obliterate slight fluctuations of temperature which may persist even after the mixing of the hot and cold streaks in the water stream passing through the nozzle 25 and the space 27. The tube 54 becomes filled with water and it also contains the bulb of a mercurial thermometer, or alternatively an electrical thermometer, and tends to attain an average temperature free from rapid fluctuations while permitting the thermometer to follow slow changes in temperature due to changing quality of the gas.

The outer burner tube 44 is made either of fused silica or the heat resisting glass known as "Pyrex" or equivalent glass and the chimney 46 is made of glass. Bitumen may conveniently be used for cementing the combustion vessel 24 and the chimney 46 to the casting 18.

Figure 7:
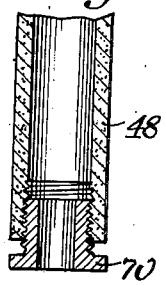
Figure 7 shows a detail (not shown in the other figures) of the calorimeter shown in Figures 1 to 4.
Figure 2:
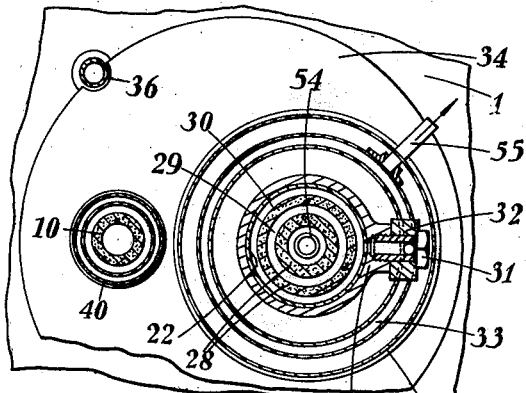
Figure 2 shows a section on the line II—II in Figure 1.
Figure 3:
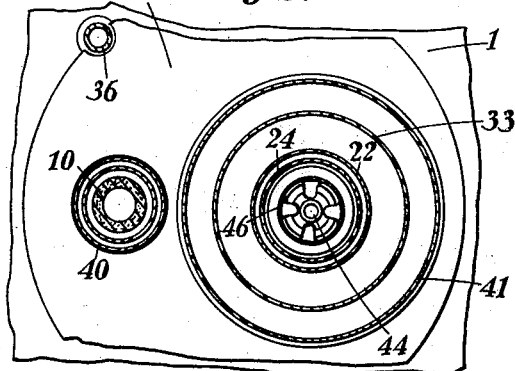
Figure 3 shows a section on the line III—III in Figure 1.
Figure 4:
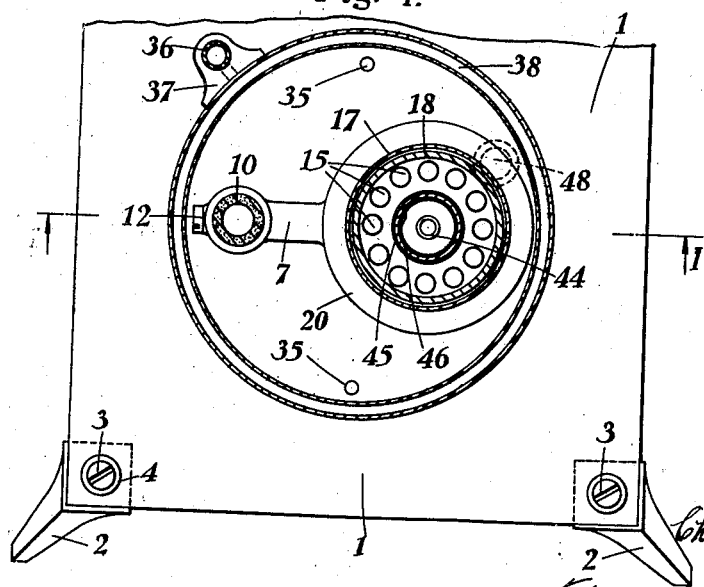
Figure 4 shows a section on the line IV—IV in Figure 1.

A number of ferrules of gradually decreasing bores are provided to fit the lower end of the tube 48 so that, when a gas of any quality is being burned, successively smaller ferrules are used by the observer until the rise of temperature in the water begins to fall off. The point is very marked and a ferrule is selected one or two sizes larger. There is no marked change until a much larger ferrule is selected allowing too much air to pass. The lower end of the tube 48 is shown in Figure 7, a ferrule 70 being shown screwed into the tube. Provision may be made for the insertion of a thermometer in the down tube 48 just below the circular member 47. By this means the very slight rise or fall of temperature of the air in passing through the instrument may be determined and an infinitesimal correction deduced if desired.

The glass wall of the chimney 46 and the glass wall of the combustion vessel 24, which may be ordinary glass, are not affected by the hot acid products of combustion. The cooled combustion products are prevented from acting on the surfaces of the base metal castings 7 and 18 and the tubes 15, constituting the secondary heat exchange zone, by a sound coating of a varnish, made from a synthetic resin such as the material known as "Bakelite" well baked on. Prolonged tests have shown no trace of copper in the condensation water, even though the base metal parts are made of German silver and brass. In the case of calorimeters not protected in this manner, holes are eaten in the metal parts in a very few years.

The cold water jackets shown in the figures, while desirable when the instrument is being used for tests of the highest degree of accuracy or under unfavourable conditions, are not so important in a recording calorimeter using the water and gas doling devices described in patent applications Serial Nos. 735,502 and 735,503 both filed 16th July, 1934, because the water is cooled to the air temperature before being used again. Where the cost of these jackets is inconvenient the water may be led directly into the cold thermometer tube 10.

Figure 5:
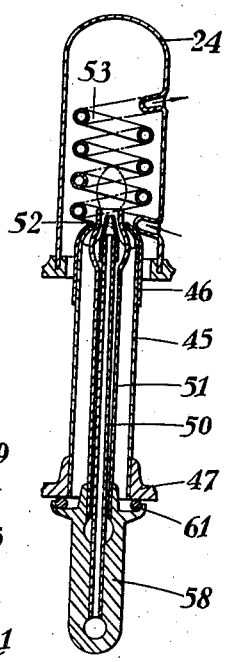
Figure 5 shows a modification of part of the apparatus shown in Figures 1 to 4.

Figure 5 shows an alternative burner and combustion vessel which are particularly suitable for use when oxygen is used as the combustion-supporting gas. The oxygen may be doled into the apparatus by means of a gas doling device constructed in accordance with patent application Serial No. 735,503 aforesaid and the gas to be tested may be supplied by a similar device. The link 53 of the Watt's straight line parallel motion device is made as illustrative to bring gas from the lower swivel and oxygen from the upper swivel to two tubes 50 and 51 respectively. The upper end of the inner tube terminates in a burner nozzle 52 made of fused silica or of platinum The intensely hot flame and rising gases pass harmlessly up within a water cooled helix 53 and then, having lost much of their extreme heat, are diverted harmlessly by the round top of the combustion space and descend outside the helix. Heat resisting glass will withstand the severe conditions but fused silica may be used if preferred. The glass chimney 46 is, in this case, cut down and is turned in over the claws of the tube 45, these two being held exactly as in Figure 1. The upper end of the link 58 carries a circular dished plate holding a rubber ring 61 to make an air tight joint with the circular member 47.

When oxygen is used for combustion, the absence of the very large volume of atmospheric nitrogen causes the escaping gases to be of very much less volume and the limitation of accuracy due to any small change of temperature of the gases in their passage or to the more serious water vapour content, even though determined with the greatest care, is much less than it is when air is used for combustion. Air accurately measured out may, however, be used with this burner where it may for any reason be preferred and, if used, the water cooled helix can be omitted.

Figure 6:
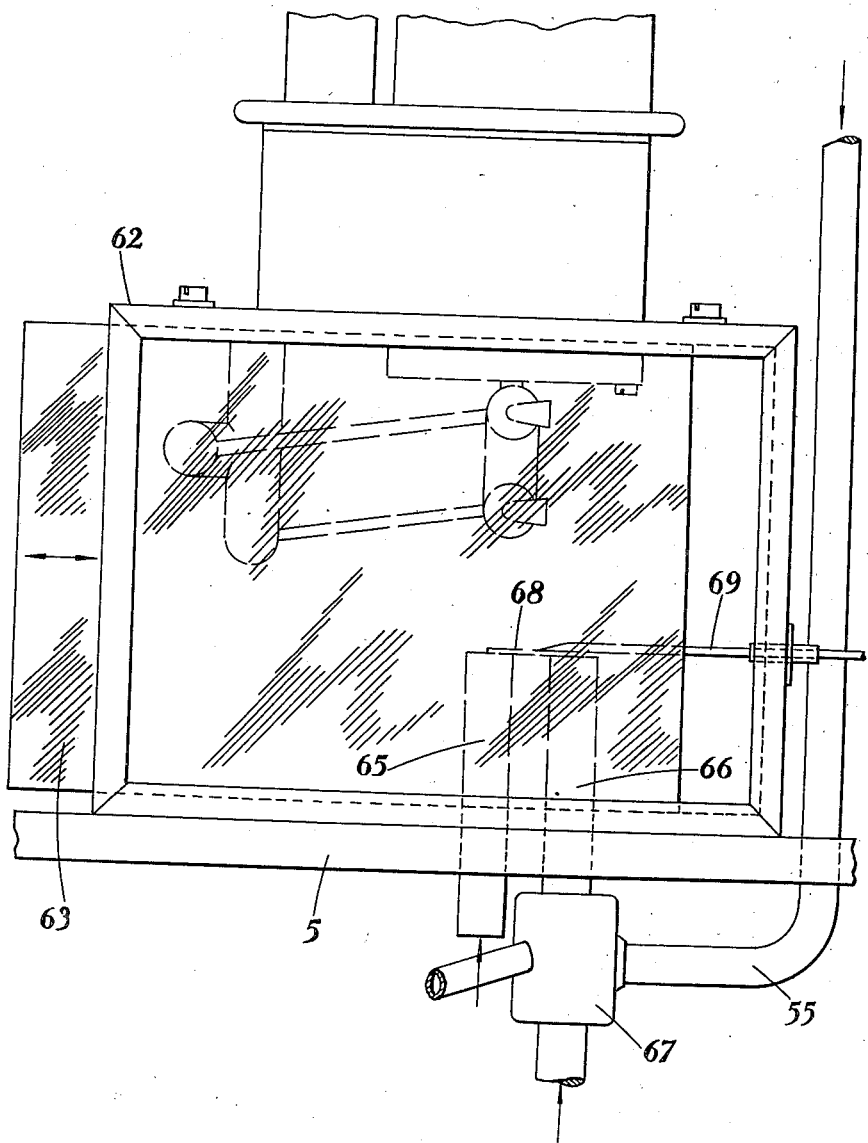
Figure 6 shows another addition to the apparatus shown in Figures 1 to 4.

In the modification shown in Figure 6, the four legs 2 (shown in Figure 1) are replaced by a box 62, on the top of which the calorimeter unit is mounted. The box is normally kept closed but may be opened by sliding out a glass panel 63 towards the left and which normally serves as one of the walls of the box. The box 62 is shown standing on the floor 5 of the cupboard. The air for combustion enters the box through two tubes 65 and 66 which are in free communication with the surrounding atmosphere. A jacket 67, connected to the pipe 55, surrounds the tube 66 so that the air passing through the tube 66 is heated by the hot water leaving the calorimeter. The temperature of the air that reaches the calorimeter may be controlled by a damper 68 which may be moved laterally by a rod 69 projecting through an opening in one wall of the box 62. When the damper 68 is moved towards the left (as seen in Figure 6) the quantity of air passing through the tube 65 is reduced while the quantity of air passing through the tube 66 is increased, so that the proportion of air heated by the jacket 67 is increased. When the damper 68 is moved towards the right the proportion of cold air is increased. The box 62 serves to prevent the flame in the calorimeter from being blown out when the cupboard in which the calorimeter is located is opened.

The gases that leave the calorimeter are saturated with water vapour while the air and gas that enter the apparatus are not saturated. Thus more steam escapes from than enters the apparatus and the latent heat is compensated by the initial heating of the air. The exact amount of initial heating (that is the adjustment of the damper 68) depends on the water vapour content of the entering air and gas, but a fair average heat balance is obtained if the air entering the instrument is raised about 5° C. above the saturated gas leaving it.

It will be noticed that in the calorimeters described above, the water content is very small and the quantity of material to be heated is small also, so that the final temperature is reached unusually quickly. Hence the instrument is suitable for quick testing of samples. The calorimeters are also suitable for use in recording calorimeters or for use with all the refinement necessary for evaluating minor corrections. They are suitable for tests of the highest degree of accuracy, such as for finding the heats of combustion of the standard pure gases. For this purpose when used with the gas doling device described in patent application Serial No. 735,503 aforesaid there is the great advantage that gas initially dry is not diluted with one per cent. of water vapour or even more.

I claim:—

1. In a liquid-flow gas calorimeter, a gas burner, a primary conduit formed from a fusible silicious material arranged to receive in direct contact with its silicious walls the products of combustion from said burner, a secondary conduit communicating directly with said primary conduit so as to receive the products of combustion after they have passed through said primary conduit, and means for conveying a stream of cooling liquid first over the walls of said secondary conduit in such a direction as to effect a counter-current interchange of heat with the products of combustion and then over the silicious walls of said primary conduit in direct contact with said silicious walls, said primary conduit being of such dimensions that a large proportion of the heat of the products of combustion is abstracted before they reach said secondary conduit, while the latter comprises base metal walls and a corrosion-resisting coating.

2. In a liquid-flow gas calorimeter, a gas burner including two vertical tubes having adjacent upper ends and arranged to feed the gas flame, a primary conduit comprising walls formed solely from fusible silicious material arranged to receive the products of combustion from said burner, a secondary conduit communicating directly with said primary conduit so as to receive the products of combustion after they have passed through said primary conduit, both of said conduits being sealed against the entry of surrounding air, and means for conveying a stream of cooling liquid first over the walls of said secondary conduit in such a direction as to effect a counter-current interchange of heat with the products of combustion and then over the silicious walls of said primary conduit, said primary conduit being of such dimensions that a large proportion of the heat of the products of combustion is abstracted before they reach said secondary conduit, while the latter comprises base metal walls and a corrosion-resisting coating, and one of said tubes in said burner being arranged so that it can be connected to a source of supply of gas while the other of said tubes in said burner is arranged so that it can be connected to a source of supply of combustion supporting gas.

3. In a liquid-flow gas calorimeter, a gas burner, a primary conduit arranged to receive the products of combustion from said burner, an annular secondary conduit in direct communication with said primary conduit and located beneath said primary conduit, means for conveying a stream of cooling liquid first over the walls of said secondary conduit and then over the walls of said primary conduit, and a Watt's straight line parallel linkage motion device arranged normally to support said gas burner in a substantially vertical position so that it extends through said annular secondary conduit and so that its upper end lies within said primary conduit, said parallel motion linkage serving to permit said gas burner to be withdrawn to an inclined position at a point below said conduits for lighting and inspection purposes and one of the links in said linkage being in the form of a tube pivoted about a fixed point and adapted to convey gas to said burner.

4. In a liquid-flow gas calorimeter, a gas burner, a primary conduit formed from a fusible silicious material arranged to receive in direct contact with its silicious walls the products of combustion from said burner, a secondary conduit communicating directly with said primary conduit so as to receive the products of combustion after they have passed through said primary conduit, means for conveying a stream of cooling liquid first over the walls of said secondary conduit in such a direction as to effect a counter-current interchange of heat with the products of combustion and then over the silicious walls of said primary conduit in direct contact with said silicious walls and a silicious tubular helix located within said primary conduit and communicating with the outside thereof at each end of said helix so that the products of combustion are cooled by liquid flowing simultaneously over the walls of said primary conduit and through said helix, said primary conduit being of such dimensions that a large proportion of the heat of the products of combustion is abstracted before they reach said secondary conduit, while the latter comprises base metal walls and a corrosion-resisting coating.

5. In a liquid-flow gas calorimeter, a gas burner, a primary conduit arranged to receive the products of combustion from said burner and comprising walls made solely of fusible silicious material, a secondary conduit communicating with said primary conduit so as to receive the products of combustion after they have passed through said primary conduit, a liquid jacket surrounding said primary conduit and said secondary conduit so as to convey a stream of liquid first over said secondary conduit then over said primary conduit, a support for a thermometer for measuring the heat of the liquid after it has passed over said secondary conduit and said primary conduit, said jacket being extended past said primary conduit to the said thermometer support, and a throttling nozzle located in said jacket so as to mix intimately any hot and cold streaks in the liquid stream after the latter has passed said primary conduit and before it reaches said thermometer support said primary conduit being of such dimensions that a large proportion of the heat of the products of combustion is abstracted before they reach said secondary conduit, while the latter comprises base metal walls and a corrosion-resisting coating.

6. In a liquid-flow gas calorimeter, a gas burner, a plurality of conduits arranged to receive the products of combustion from said burner and to provide a number of zones in which said products are successively cooled, a hot thermometer support and means for conveying a stream of cooling liquid over the walls of said conduits to said hot thermometer support, said hot thermometer support including a pocket adapted to receive the sensitive element of a thermometer, to lie in the stream of cooling liquid and to be filled with liquid so as to protect said thermometer from rapid fluctuations of temperature while the liquid stream passes over the walls of said pocket and the walls of the first of said zones to receive the hot gases being formed only of fusible silicious material and made of such dimensions that a large proportion of the heat of the products of combustion is transferred through them to the cooling liquid, while the walls of the last of said zones are formed from base metal having a corrosion-resisting coating.

7. A liquid-flow gas calorimeter comprising in combination a substantially vertical gas burner, a canopy formed only of fusible silicious material supported over the mouth of said burner, a hollow annular receiver connected to the lower end of said canopy so that the products of combustion of said burner pass into said canopy and then into said receiver, a plurality of substantially vertical tubes extending downwards from said receiver so as to convey the products of combustion therefrom, a shield surrounding said tubes, said receiver and said canopy, conduits serving to connect the space within said shield with a source of supply of cooling liquid so that said cooling liquid passes first over said substantially vertical tubes then over said receiver and then over the walls of said canopy, said conduits comprising liquid jacketing means surrounding only the cold parts of the calorimeter so as to protect them from outside temperature disturbances and said canopy being of such dimensions that a large proportion of the heat of the products of combustion is abstracted before they reach said receiver.

8. In a liquid-flow gas calorimeter, a substantially vertical gas burner, a vertical primary conduit comprising walls formed only of fusible material surrounding said burner and arranged to receive the products of combustion from said burner, a secondary conduit communicating directly with said primary conduit so as to receive the products of combustion after they have passed through said primary conduit and arranged below said primary conduit, means for supporting a thermometer above said primary conduit, a jacket surrounding said secondary conduit and said primary conduit and extending to said means for supporting said thermometer so that a stream of cooling liquid may pass upwards first over said secondary conduit and then over said primary conduit to said thermometer supporting means, a hot liquid jacket surrounding said first-mentioned jacket at said thermometer supporting means and adapted to receive the liquid after it has passed said thermometer supporting means and a metallic shield extending downwards from the hot liquid jacket so as to surround substantially the whole of said primary conduit, the latter being of such dimensions that a large proportion of the heat of the products of combustion is abstracted before they reach said secondary conduit.

9. In a liquid-flow gas calorimeter, a vertical gas burner, a primary conduit comprising walls formed only of fusible silicious material arranged to receive the products of combustion from said burner, a secondary conduit communicating directly with said primary conduit so as to receive the products of combustion after they have passed through said primary conduit, said secondary conduit being located beneath said primary conduit and comprising a number of parallel tubes of a material having a relatively low heat conductivity arranged about said gas burner, and means for conveying a stream of cooling liquid first over the walls of said secondary conduit and then over the walls of said primary conduit, said tubes being lined with a corrosion resisting coating.

10. In a liquid-flow gas calorimeter, a vertical gas burner, a tube made of fusible silicious material surrounding said burner and in communication with the atmosphere at its lower end, a deflector hood made of fusible silicious material and arranged over the upper end of said tube so as to provide an annular conduit, surrounding said tube, for the products of combustion from said burner, a plurality of substantially vertical pipes arranged about said burner and arranged below said hood so as to receive the products of combustion after they have passed between said tube and said hood, means for conveying a stream of water upwards first over said pipes and then over said hood so that the products of combustion are cooled to a large extent when within said hood and are cooled completely when within said pipes.

11. In a liquid-flow gas calorimeter, a gas burner, a conduit arranged to receive the products of combustion from said burner, means for conveying a stream of cooling liquid over the walls of said conduit, walls arranged normally to enclose a space beneath said burner but adapted to permit access, when necessary, to said space, means arranged normally to support said burner within said conduit and to permit said burner to be withdrawn into said space for inspection and lighting purposes, a conduit for leading combustion supporting air from said space to the upper end of said burner when the latter is in its normal position, two pipes for leading air from the surrounding atmosphere to said space, conduits for leading the liquid heated by the products of combustion past the walls of one of said pipes so as to warm the air passing through it, and valve means for controlling the quantity of air passing through each of said pipes.

CHARLES VERNON BOYS.